United States Patent
Sailer et al.

(10) Patent No.: US 7,882,221 B2
(45) Date of Patent: Feb. 1, 2011

(54) METHOD AND SYSTEM FOR MEASURING STATUS AND STATE OF REMOTELY EXECUTING PROGRAMS

(75) Inventors: Reiner Sailer, Scarsdale, NY (US); Leendert Peter van Doorn, Valhalla, NY (US); Xiaolan Zhang, Croton, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 12/131,184

(22) Filed: Jun. 2, 2008

(65) Prior Publication Data

US 2008/0235372 A1 Sep. 25, 2008

Related U.S. Application Data

(63) Continuation of application No. 10/734,532, filed on Dec. 12, 2003.

(51) Int. Cl.
G06F 15/173 (2006.01)
(52) U.S. Cl. ...................... 709/224; 709/223
(58) Field of Classification Search .......... 709/223–224
See application file for complete search history.

(56) References Cited

U.S. PATENT DOCUMENTS

| 6,108,700 | A  | * | 8/2000  | Maccabee et al. ........... 709/224 |
| 6,263,431 | B1 | * | 7/2001  | Lovelace et al. ................ 713/2 |
| 6,289,453 | B1 | * | 9/2001  | Walker et al. ................ 713/175 |
| 6,393,578 | B1 | * | 5/2002  | Swidler et al. .............. 713/600 |
| 6,697,948 | B1 | * | 2/2004  | Rabin et al. .................... 726/30 |
| 6,725,243 | B2 | * | 4/2004  | Snapp ........................ 707/203 |
| 6,738,798 | B1 | * | 5/2004  | Ploetz et al. ................ 709/203 |
| 6,775,682 | B1 | * | 8/2004  | Ballamkonda et al. ............. 1/1 |
| 6,847,995 | B1 | * | 1/2005  | Hubbard et al. ............. 709/223 |
| 6,873,600 | B1 | * | 3/2005  | Duffield et al. ............. 370/252 |
| 6,904,020 | B1 | * | 6/2005  | Love et al. .................. 370/252 |
| 6,907,561 | B2 | * | 6/2005  | Kojima ........................ 714/784 |
| 6,938,164 | B1 | * | 8/2005  | England et al. ............. 713/193 |
| 7,024,431 | B1 | * | 4/2006  | Kornelson et al. .......... 707/202 |
| 7,076,547 | B1 | * | 7/2006  | Black ......................... 709/224 |
| 7,222,190 | B2 | * | 5/2007  | Klinker et al. ............. 709/238 |
| 7,281,205 | B2 | * | 10/2007 | Brook ........................ 715/237 |
| 7,292,537 | B2 | * | 11/2007 | Charcranoon ............... 370/252 |
| 7,313,668 | B2 | * | 12/2007 | Worley ....................... 711/207 |
| 7,315,826 | B1 | * | 1/2008  | Guheen et al. ................. 705/7 |
| 7,426,738 | B2 | * | 9/2008  | Deverill et al. ............. 719/328 |
| 2002/0073317 | A1 | * | 6/2002 | Hars ........................... 713/176 |
| 2002/0091712 | A1 | * | 7/2002 | Martin et al. ............... 707/200 |
| 2002/0099691 | A1 | * | 7/2002 | Lore et al. ..................... 707/2 |
| 2003/0033543 | A1 | * | 2/2003 | Hubbard et al. ............. 713/201 |
| 2003/0074548 | A1 | * | 4/2003 | Cromer et al. ................. 713/1 |
| 2003/0115316 | A1 | * | 6/2003 | Yang-Huffman ........... 709/224 |

(Continued)

Primary Examiner—David E England
(74) Attorney, Agent, or Firm—Tutunjian & Bitetto, P.C.; Preston J. Young, Esq.

(57) ABSTRACT

A system and method for providing attestation and/or integrity of a server execution environment are described. One or more parts of a server environment are selected for measurement. The one or more parts in a server execution environment are measured, and the measurements result in a unique fingerprint for each respective selected part. The unique fingerprints are aggregated by an aggregation function to create an aggregated value, which is determinative of running programs in the server environment. A measurement parameter may include the unique fingerprints, the aggregated value or a base system value and may be sent over a network interface to indicate the server environment status or state.

37 Claims, 10 Drawing Sheets

U.S. PATENT DOCUMENTS

| | | | |
|---|---|---|---|
| 2003/0172064 A1* | 9/2003 | Snapp | 707/5 |
| 2003/0212778 A1* | 11/2003 | Collomb | 709/223 |
| 2004/0064668 A1* | 4/2004 | Kjos et al. | 711/202 |
| 2004/0199793 A1* | 10/2004 | Wilken et al. | 713/201 |
| 2005/0021968 A1* | 1/2005 | Zimmer et al. | 713/176 |
| 2005/0060643 A1* | 3/2005 | Glass et al. | 715/501.1 |
| 2005/0091652 A1* | 4/2005 | Ross et al. | 718/1 |
| 2005/0132031 A1* | 6/2005 | Sailer et al. | 709/223 |
| 2005/0235166 A1* | 10/2005 | England et al. | 713/193 |
| 2005/0283445 A1* | 12/2005 | Trinon et al. | 705/75 |
| 2005/0289065 A1* | 12/2005 | Weare | 705/51 |
| 2007/0005297 A1* | 1/2007 | Beresniewicz et al. | 702/181 |
| 2007/0208805 A1* | 9/2007 | Rhoads et al. | 709/203 |
| 2007/0255757 A1* | 11/2007 | Tsukerman et al. | 707/104.1 |
| 2008/0155697 A1* | 6/2008 | Zuk | 726/25 |
| 2008/0235372 A1* | 9/2008 | Sailer et al. | 709/224 |
| 2009/0019547 A1* | 1/2009 | Palliyil et al. | 726/25 |
| 2009/0046625 A1* | 2/2009 | Diener et al. | 370/319 |
| 2009/0313473 A1* | 12/2009 | Walker et al. | 713/175 |

* cited by examiner

METHOD AND SYSTEM FOR MEASURING STATUS AND STATE OF REMOTELY EXECUTING PROGRAMS

RELATED APPLICATIONS INFORMATION

This application is a continuation co-pending of U.S. patent Ser. No. 10/734,532, filed Dec. 12, 2003, which is incorporated by reference herein in its entirety.

BACKGROUND OF THE INVENTION

1. Field of the Invention

The present invention relates to software measurement and attestation, and more particularly to software measurement of status and state of remote running programs.

2. Description of the Related Art

Attesting or determining the status of running programs on a computer device is difficult as the entire process is dynamic. It is even more difficult in a client server environment where multiple remote clients are trying to gain access to a server and desire a system check to ensure the safety and security of their own systems.

Conventional systems, such as, a Trusted Computing Group (TCG) Trusted Platform Module (TPM) provide some measurements. Current Basic Input Output Systems (BIOS) and the bootstrap loaders (with the necessary modifications) measure their integrity and that of the kernel that is booted. TCG takes a very static view of the kernel, however, and the system that is consequently booted. This is a problem because the kernel is an evolving target in which modules are loaded and unloaded. The same goes for applications and associated files. These are constantly being created and removed.

Using the TCG model, it would be ideal to measure the entire system at boot time, but this is extremely time-consuming to do. In one example, for 15 Gb of executables, libraries, configuration files that comprise an illustrative LINUX® system, it will take more than 12 minutes to complete a measurement.

Attesting systems or programs, which may exist, do not perform tests on running systems. Instead, they perform attestations at boot-up on, for example, read-only memories of small size (e.g., a few kilobytes). For server attestation, the memory is too large. Hash sum calculations over an entire unchanging content take too long for server attestation. Further, the set of programs available for execution on the server changes over time and is too large to measure as a whole.

Therefore, a need exists for systems and methods for measuring status and states of executable programs, especially programs being run at remote locations or on remote servers.

SUMMARY OF THE INVENTION

The present disclosure provides a set of mechanisms to perform integrity measurements dynamically and efficiently, and the resulting attestation methods.

Integrity measurements of an operating system, applications, runtime support, and optional configuration files are then used for remote attestation. A more flexible scheme is provided for kernel modules so that the kernel modules can be added to the measurements when the kernel modules are actually loaded into the kernel.

Applications include many components, main programs, shared libraries, configuration files, etc. which all impact the measurement of the application. As with modules, the present invention measures the applications at load time. However, the applications are not measured at each load since that incurs significant overhead. Instead, a caching technique is employed where the measurement is taken once, extends Platform Configuration Registers (PCR) in the TPM, and caches the measurement result.

If a measurement is cached, the TPM is not extended, and the cache entries are purged whenever the file is modified. This mechanism has a very low execution time overhead and still ensures valid and meaningful measurements. The system maintains an ordered list, which holds the integrity measurements (e.g., a SHA-1 secure hash sum) of all the entities (kernel modules, applications, libraries, config files, etc.) that were loaded by the system. Just before an entity is loaded, it is measured and the result is stored in this list or table. The integrity of this table is guaranteed by extending an associated PCRn. This PCRn holds the aggregate hash value of the table or list and original kernel PCRj (where j=n−1).

For remote attestation, the remote verifier is given all the PCR values and an ordered list of measurements. The verifier validates the PCR 1 . . . j through the traditional methods. It validates PCRn by extending PCRj with all the values in the measurement table (which is ordered). The resulting value should be equal to PCRn. This ensures that the measurement list is not tampered with. The verifier can then test the individual measurement values using whatever applicable attestation model. This attestation model is driven by a separate attestation policy, which may be customer specific.

Computing the secure hash of each file (kernel module, application, library) is computationally intensive. To optimize this, the measurement list is used as a cache. If a file has already been measured it is not measured again. If the file is modified, the secure hash is recomputed for it and the PCRn is extended with the new measured value.

The mechanism described above is additive. That is, it only records all the entities that are added to the system. It does not record which modules are removed from the kernel or which applications finished execution. This information can be recorded in a separate list and be protected by a different PCRm to protect the integrity of this table.

A system and method for providing attestation and/or integrity of a server execution environment are described. One or more parts of a server environment are selected for measurement. The one or more parts in a server execution environment are measured, and the measurements result in a unique fingerprint for each respective selected part. The unique fingerprints are aggregated by an aggregation function to create an aggregated value, which is determinative of running programs in the server environment. A measurement parameter may include the unique fingerprints, the aggregated value or a base system value and may be sent over a network interface to indicate the server environment status or state.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
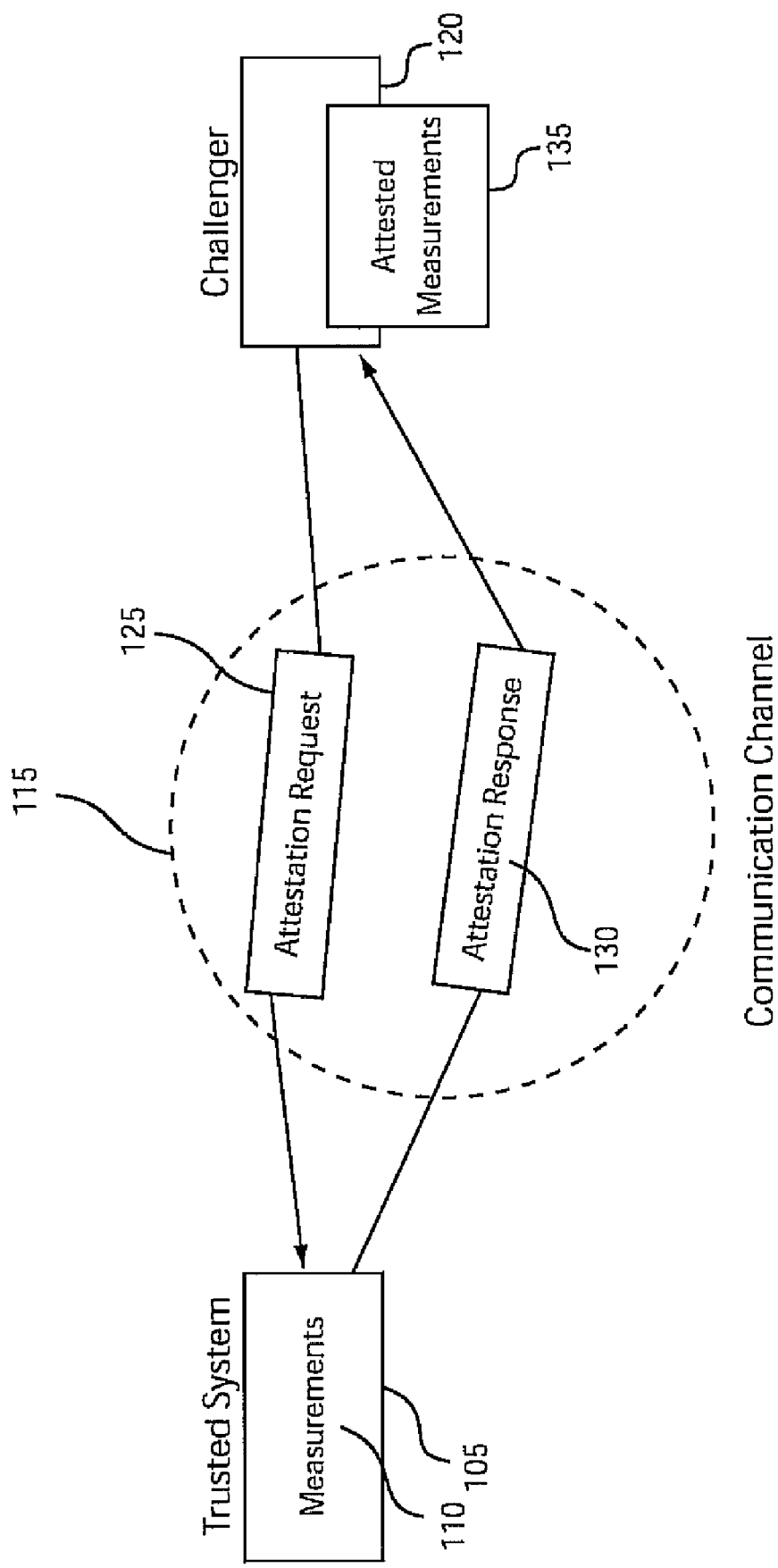
FIG. 1 is a block diagram of one illustrative system embodiment of the present invention, which may include a server, network, clients, and attestation capabilities.

An aspect of the present invention includes an improved system and method for measuring status and state of a remote runtime environment. A major problem exists in scalability with regard to a number of measurements which can be taken (run-time overhead, memory overhead) with respect to a server execution environment or any computer execution environment. The scalability issue extends reporting issues to remote parties for evaluation as well (evaluation overhead).

The present invention attests to the status and state of remotely executing programs, and may provably attest the status and state of remote and/or dynamic runtime environments. In useful embodiments, before a program is executed, a secure hash sum is computed over the instructions of the program, and the result is stored in a coprocessor to prove to an external party what is actually running on a system. The determination of what is running includes kernel modules, shared libraries, java code, java scripts, etc., and all interpretive code.

To identify what is being run on a system, a set of modules/programs/processes may be selected (one at a time or in groups) from a larger set of modules, and the selected modules may each be identified as running and/or may have their present state determined. This information may be stored for later reference.

For example, a client wants to perform a transaction on a web server, in a banking application on the web server. The client wants to insure that correct banking application on the server is running and that there are no viruses or subversive-type programs running/masquerading instead. By performing an attestation or determination in accordance with this disclosure, such information will be made available to the user. Advantageously, this information may be made available prior to his execution of his banking transaction.

Preferably, a client device performs the verification. The server performs the computation and measurement.

The present invention is particularly useful in a runtime environment. A runtime environment includes programs, libraries, environment variables, configuration files, interpreted executable content, java programs, Java Script, Pearl programs/script, shell programs/scripts, etc. which are executable during system operations.

Initially, executable content may be loaded from storage to main memory on, e.g., a server. A new environment is created with executable content, setting parameters, etc. One or more parts of the environment are selected for measurement. A secure hash sum or other parameter is computed for the selected parts. The hash sum is securely stored (e.g., in a secure coprocessor).

These steps may be repeated until all parts of the system have been attested or the desired portions of the system have been attested. The hash sums of the base system (set or firmware or software, and base operating system parameters of the server) can be aggregated with an aggregation function to compute a base value. The client may be provided with one or more of the hash sums, the aggregate value, and the base value, as an attestation that the system is functioning in a secure manner. Known aggregation functions may be employed, and these may be as simple as an adding function, for example. More complex aggregation functions are also contemplated.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces. Referring now to the drawings in which like numerals represent the same or similar elements and initially to FIG. 1, in accordance with at least one embodiment, a challenging party 120 automatically retrieves attested integrity measurements 110 from a trusted system 105 to determine or verify this system's (105) integrity status. An environment in which challenging parties 120 rely on the integrity of other systems to delegate processing tasks or to retrieve data is illustratively shown to demonstrate one embodiment of the present invention. Trusted system 105 includes a list of measurements 110 that reflects the code that was loaded on this system since system start-up. Trusted system 105 maintains a complete ordered list of all such measurements.

Challenger 120 sends an attestation request 125 over a communication channel 115. When trusted system 105 receives an attestation request message 125, system 105 attests all its measurements since re-boot, composes attestation response message 130, and sends message 130 to client system 120. Client system 120 compares the received and verified measurements with expected trusted measurement values to generate an attested measurement list 135. List 135 includes relevant data, which results from measurements of trusted system 105.

Figure 2:
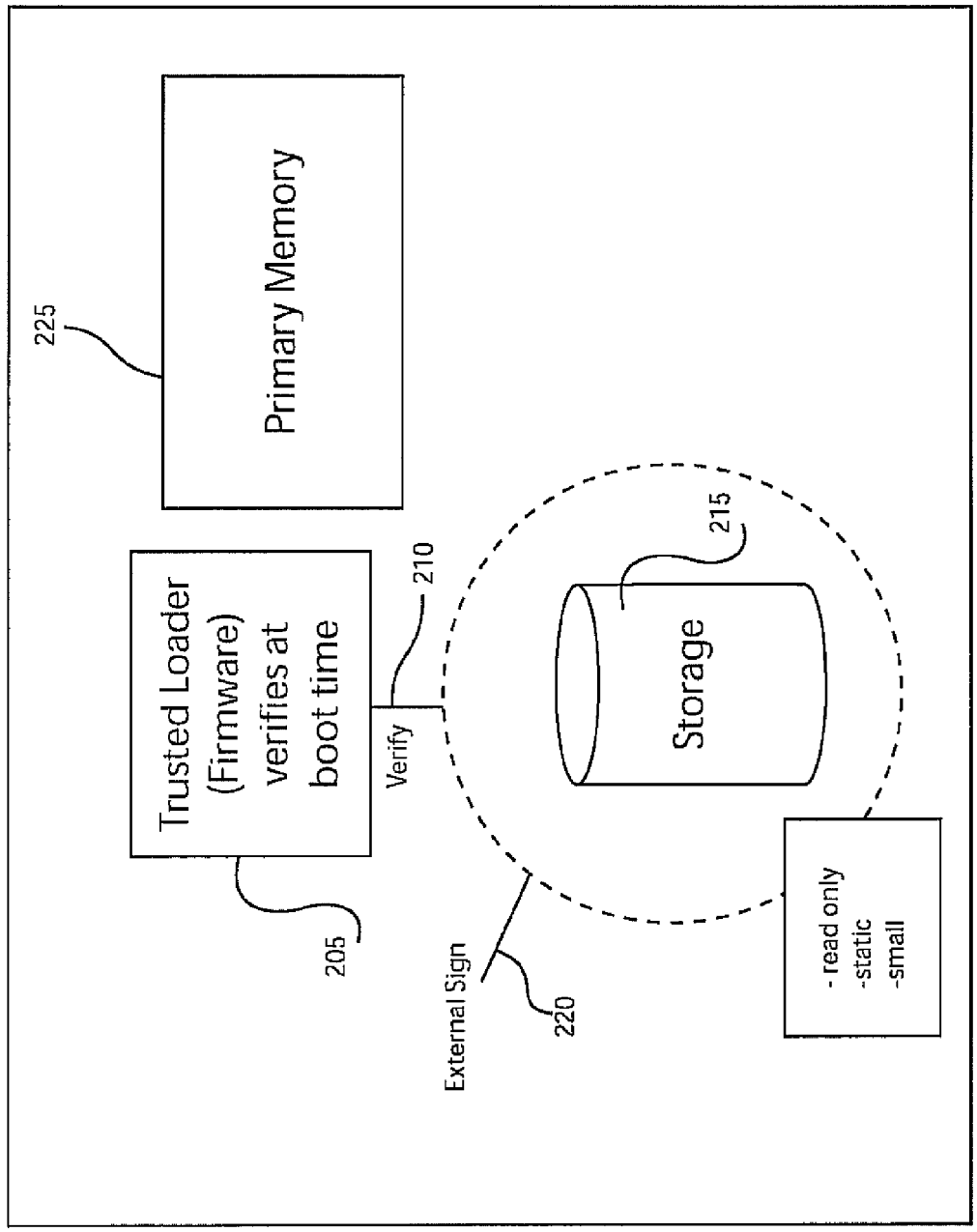
FIG. 2 is a block diagram of a prior art environment.

Conventional approaches to ensure system integrity against challenging parties do not scale for complex and changing system environments (See FIG. 2).

FIG. 2 shows a prior art scheme for verifying system integrity. A storage system 215 includes read-only files that are static and rarely change. The storage 215 will typically be very restricted because any content that could potentially impact integrity of a trusted platform must be externally signed 220 by a party the challenging party trusts. A trusted loader 205 verifies the signature of any code before it is loaded and only loads verified code that was externally signed by a trusted party 220. If the verification succeeds, then the loading is completed, and the code is stored in storage 215 or becomes available for execution. If the verification fails, exception handling is entered and the code is not loaded. This is a preventive strategy, but it introduces large overhead and does not scale with complex large and dynamic environments because any change would have to be signed, whether it is used or not and thereby affects system integrity.

Any programs that can be loaded into a primary memory 225 are verified already and thus comply with the loading requirements since the loader 205 only loads from storage 215 signed and verified data and code. Examples of this art include, for example, cryptographic coprocessors, such as the IBM 4758. The prior art systems are employed for static and small memories, which are mostly read-only memories. These systems were not scalable to larger, more complex applications. In addition, dynamic applications were not feasible, and even if they were feasible would require an enormous amount of overhead.

Figure 3:
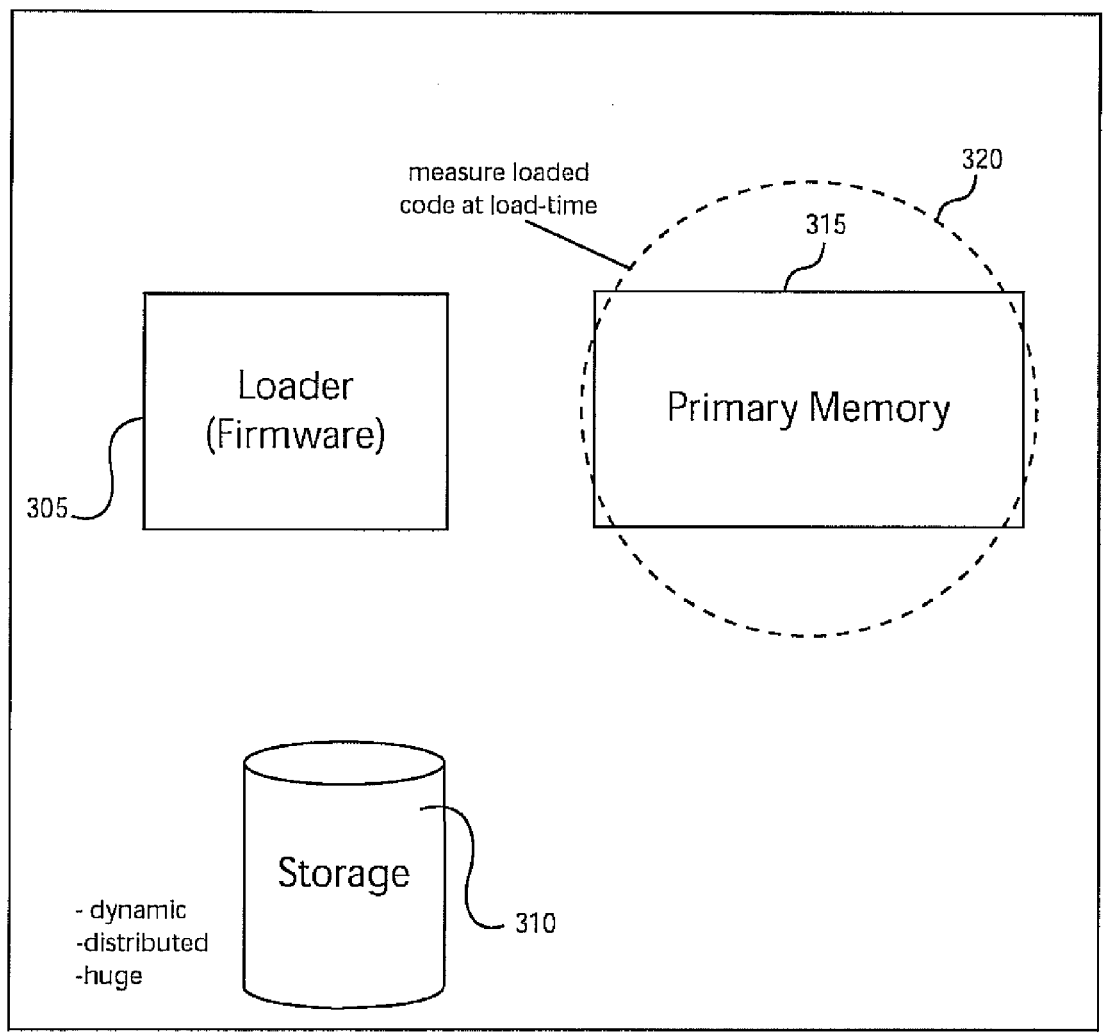
FIG. 3 is a block diagram schematically showing some of the advantages of the present invention.

Referring to FIG. 3, one embodiment of the present invention is illustratively shown. A loader 305 retrieves data from storage 310 and measures the data at load-time. Only code and data that potentially affect run-time integrity of a system are subject to a measuring program 320 before loading the code or data into a primary memory 315 and executing the code or data, which may be used as input to other programs. In one embodiment, a non-intrusive approach is employed, e.g., the approach observes but does not change the system behavior. This embodiment does not prevent integrity breaches but enables their discovery in a challenge procedure similar to that described with reference to FIG. 1. Advantageously, most of the disk storage contents, which are not loaded after re-boot, will not introduce measurements and related overhead.

Figure 4:
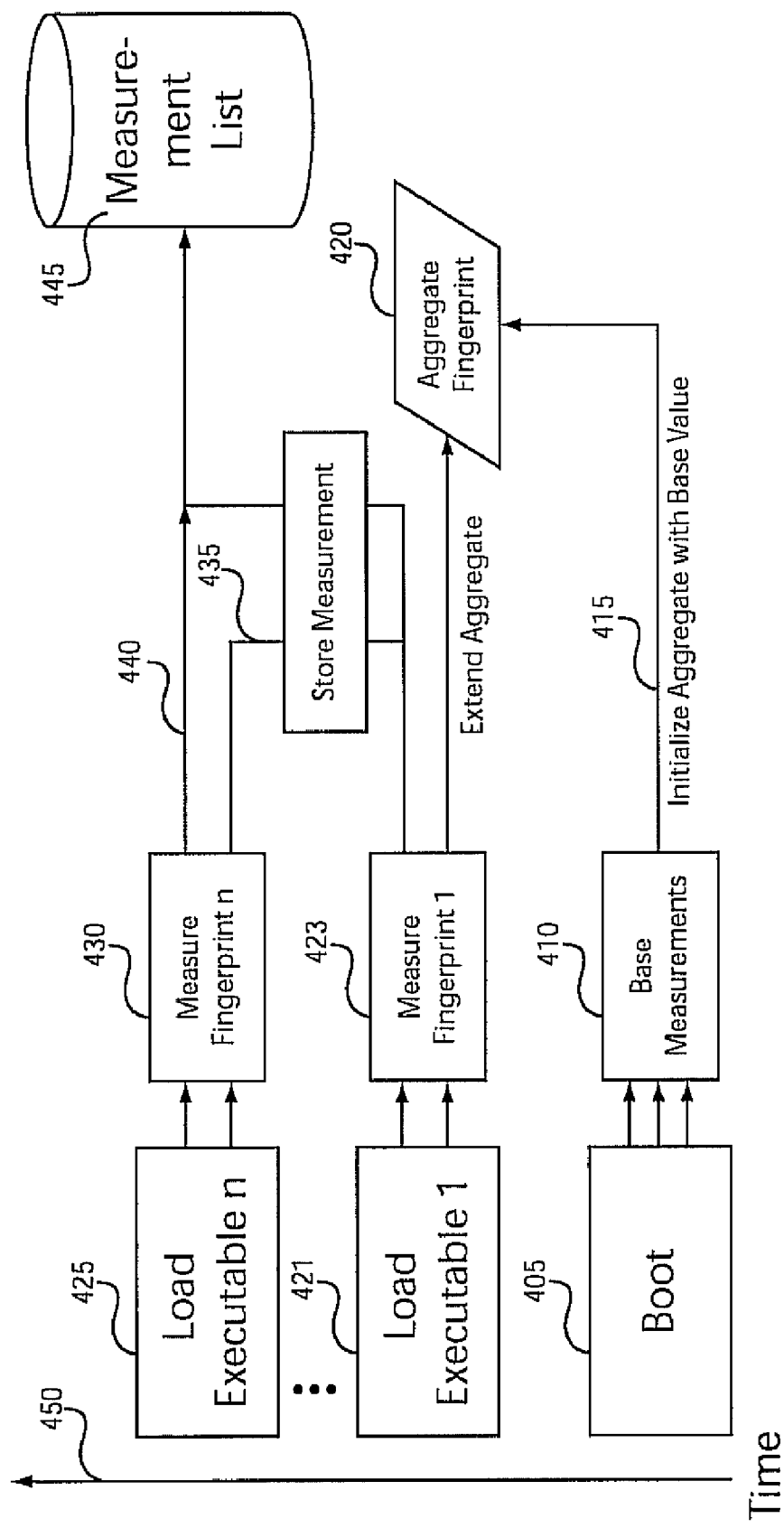
FIG. 4 is a hierarchical tree structure showing relationships among unique fingerprints, aggregated values, and base values in accordance with one embodiment of the present invention.

Referring to FIG. 4, a measurement process, which includes the concept of fingerprints, aggregates, and base values, is illustratively shown. FIG. 4 describes actions starting with the time when a system is booted. Time progression is indicated by arrow 450. Throughout the booting process 405, the system is measuring booting hardware (e.g., BIOS), an operating system loader, an operating system, and related configuration files by computing a value, e.g., a 160 bit-SHA1 (Secure Hash Algorithm No. 1 as is known in the art) value, over the loaded data and storing the value in an aggregate fingerprint 420 that can be protected by a trusted platform module (TPM) secure co-processor or any other protected register. An aggregation can be combined or extended by taking a new measurement, e.g., 430 and an existing aggregate, say from measurement 423, and calculating, for example, a 160 bit-SHA1-hash value over the existing aggregate 423 and afterwards the new measurement 430. The resulting value is a new aggregate, which can be stored in a register or other memory and updated over time. Measurements taken before the operating system is started are called base measurements 410 and an aggregate of these values is called a base value 415. When the operating system is started, the aggregate fingerprint 420 is initialized with the computed base value 415.

From then on, new measurements 430 of loaded executables or data 425 extend the aggregate fingerprint 420 in the process of aggregation as described above. As time 450 progresses, new executables (e.g., 1 to n) are loaded, and measurements are taken 423, 430, etc. Then, aggregate fingerprint 420 is updated and new measurements 430 are stored 440 in an order-preserving manner in a measurement list 445. At any time, a running system has a fresh aggregate fingerprint 420 and measurement list 445 reflecting any software and booting hardware that was involved in the current system state since the system was re-booted. At reboot, the measurement List 445 and the aggregate fingerprint 420 are cleared.

Figure 5:
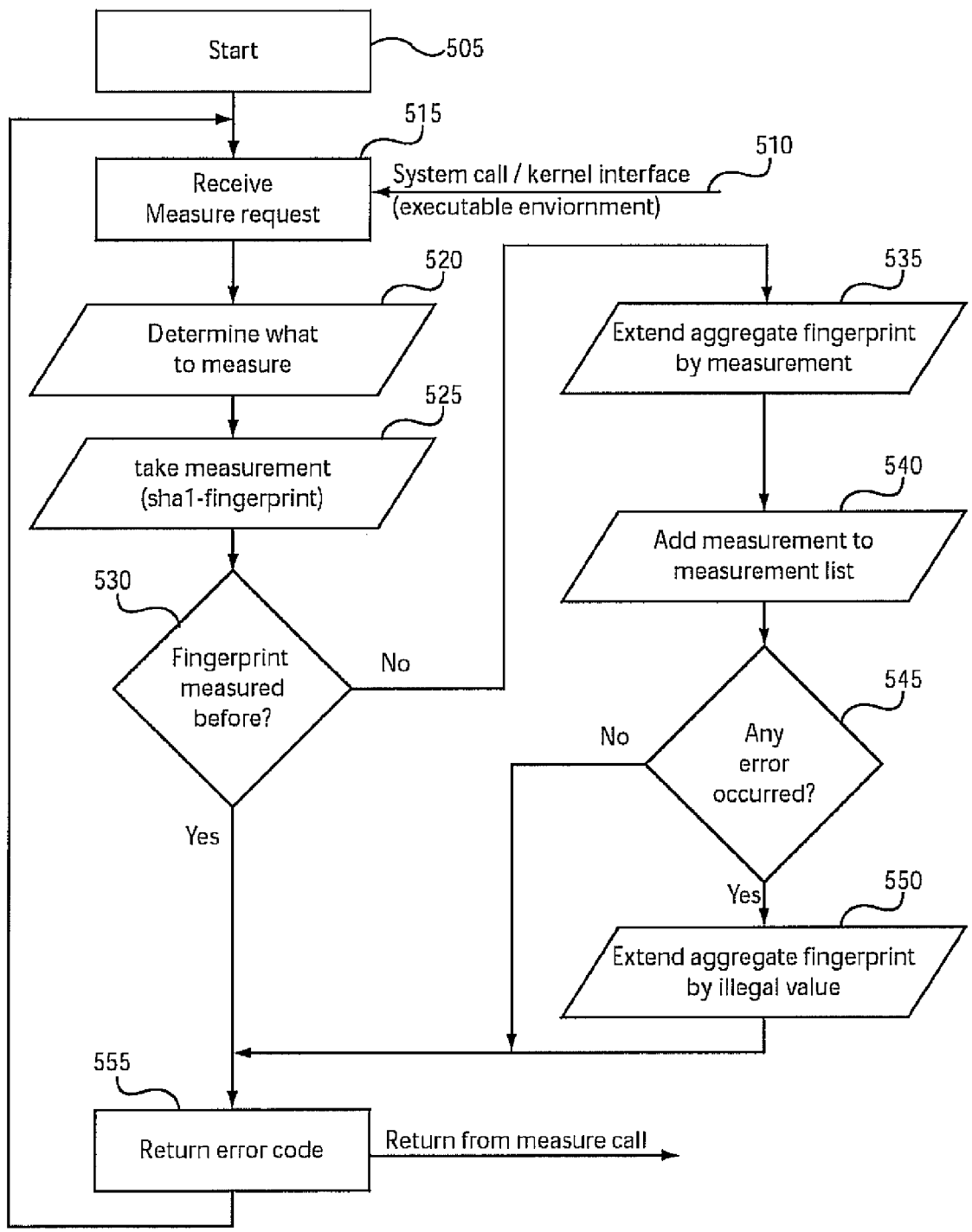
FIG. 5 is a block/flow diagram of a measurement system/method performed by a measurement agent in accordance with one embodiment of the present invention.

Referring to FIG. 5, a measurement agent in a kernel of a trusted system is described in greater detail. The method begins in block 505 when the kernel is started by a boot loader. The method then waits for invocations to measure executables or data. Such requests 510 can originate from user space via a system call interface or from the kernel via an exported kernel function. In both cases, the measurement agent receives a file pointer 515 that points to the file that is to be measured. The agent then determines, based on the file pointer, where to get the data from that is to be measured in block 520.

Afterwards, the measurement agent calculates a value, e.g., a 160 bit-SHA1 value, over the file contents in block 525 and looks up in the measurement list if this value was already measured in block 530. If this measurement is already in the measurement list, then the measurement agent continues to block 555. Otherwise, the agent extends an aggregate fingerprint in block 535 with a new measurement and stores the new measurement at the end of a measurement list as described with reference to FIG. 4.

In the next block 545, the measurement agent checks whether any error was encountered throughout the measurement. If and only if such error has occurred, an invalid or random value is used to extend the aggregate fingerprint and thus invalidate the measurement list in block 550. The purpose of this is that any error in measuring will render the trusted system unable to prove its integrity to external parties (worst-case assumption) because measurements of potentially malicious files could not be recorded in the measurement list due to the error. Then, the measurement agent returns from the measure call. Now, the calling party will be able to load the file that is now measured and whose measurement had extended the protected aggregate fingerprint. An error code in block 555 indicates back to the caller whether the measure call was successful or if any errors occurred (out of memory, file not found, etc.)

Figure 6:
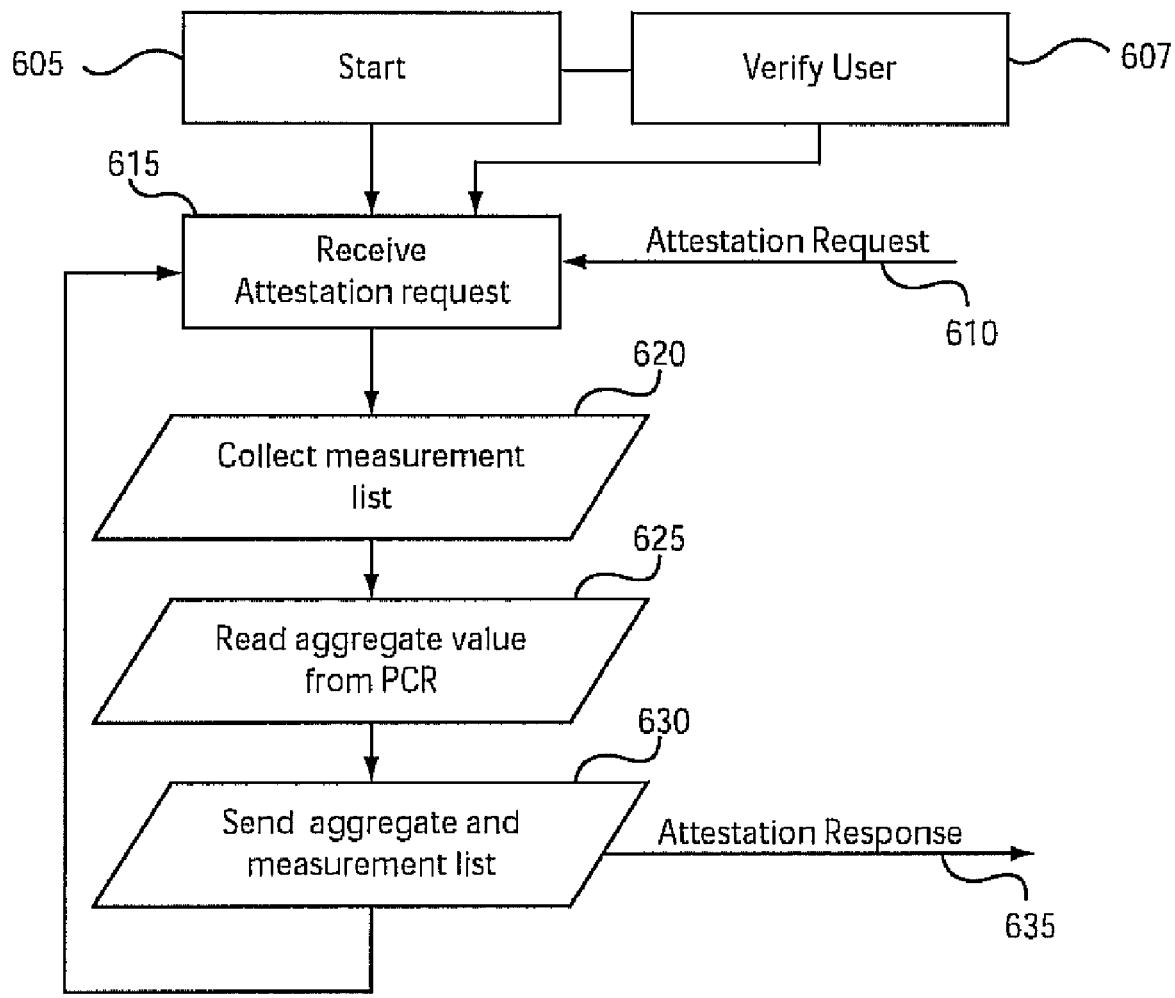
FIG. 6 is a block/flow diagram for handling attestation requests in accordance with one embodiment of the present invention.

Referring to FIG. 6, an attestation service for a Trusted System (e.g., trusted system 105 in FIG. 1) is described in greater detail. The attestation service begins in block 605 and starts on the trusted systems at any time. The trusted system waits for attestation requests 610 from third parties that challenge the integrity of the system. Upon receipt of an attestation request in block 615, the service collects the measurements in the measurement list in block 620. Then, the service reads, in block 625, an aggregate fingerprint that is signed by the protected environment that stores the fingerprint and composes an attestation response in block 635 using a measurement list and the signed aggregate fingerprint (as described above).

In step 630, the service responds to the attestation request message 610 with an aggregate response message 635, which may include the fingerprint aggregate and the measurement list, before returning to the wait state in block 615, to wait for other attestation request messages. In an optional embodiment, the attestation service can verify authorization of a third party in block 607 to ensure that the signed aggregate fingerprint and the measurement list are handed out only to authorized parties.

Figure 7:
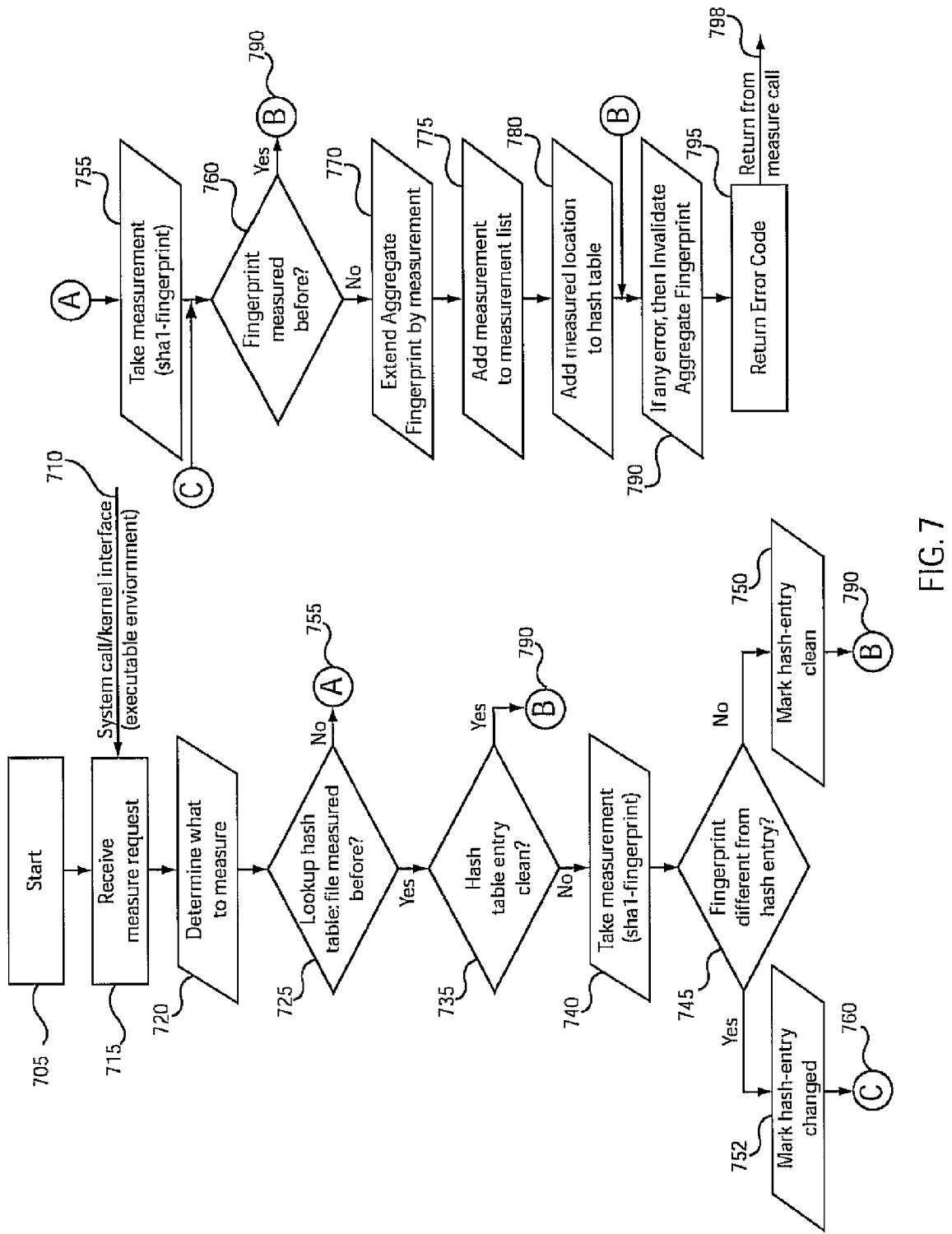
FIG. 7 is a block/flow diagram of another measurement system/method performed by a measurement agent including caching in accordance with another embodiment of the present invention.

Referring to FIG. 7, an alternate embodiment is described including optimizations of the embodiment shown in FIG. 5. This embodiment enhances the basic measure service described with respect to FIG. 5. The method is started in block 705 when the kernel is started by a boot loader. The method then waits for invocations to measure executables or data in block 715. Such requests 710 can originate from user space via a system call interface or from the kernel via an exported kernel function. In both cases, the measurement agent receives a file pointer in block 715 that points to the file that is to be measured. The agent then determines based on the file pointer where to get the data that is to be measured in block 720 (e.g., a node number of the file system). Based on this location information, the measure service maintains a hash table where it looks up in block 725, whether data at this location has been measured before.

If that location was not measured before, then the measure service takes the measurement in block 755 and looks up whether this measurement is already in the measurement list in block 760. If it is already measured, then the service continues to block 790 where the same error check is done as described with reference to FIG. 5 in blocks 545 and 550. In block 795, the measurement function or agent returns the error code to the caller and returns from the method at 798 (e.g., may return to a wait state in block 715).

If the measurement function decides in block 760 that the measurement is new, then the function extends the aggregate fingerprint in block 770, adds the measurement to the end of the measurement list in block 775, and adds the location of this file in block 780 to a hash-table (if this location is not already in the hash-table). In future iterations, this entry (e.g., file location information) is looked up in block 725 the next time this location is measured.

If a new entry is added to the hash table, then this new entry may initially be marked "clean". In cases where the system cannot keep track of changing files, e.g., for remotely mounted file systems, the entries may always be marked "dirty" or changed to enforce always measuring those files at load time. The function then continues with block 790, which invalidates the aggregate fingerprint and measurement list if an error is encountered. An error code is provided in block 795 when the program path is returned from the measure call.

If the file location is found in the hash table in block 725, then the measurement function verifies in block 735 whether the related hash-table entry is marked clean, meaning that the contents of this location have not been changed since the last measurement. If this is the case, then there is no need to measure this location again and the measurement function continues in block 790 as described above.

If the hash-table entry is marked dirty or changed (not clean) in block 735, then the data at the location is measured anew in block 740 and compared with the measurement stored in the hash-table entry in block 745. If the new measurement is the same as the old measurement (the data was not changed), then the hash-table entry can be marked clean in block 750 and the measurement function resumes with block 790 as described. If the new measurement is different from the old measurement, then the hash-table entry is marked as changed and the function continues with a new measurement in block 760.

Figure 8:
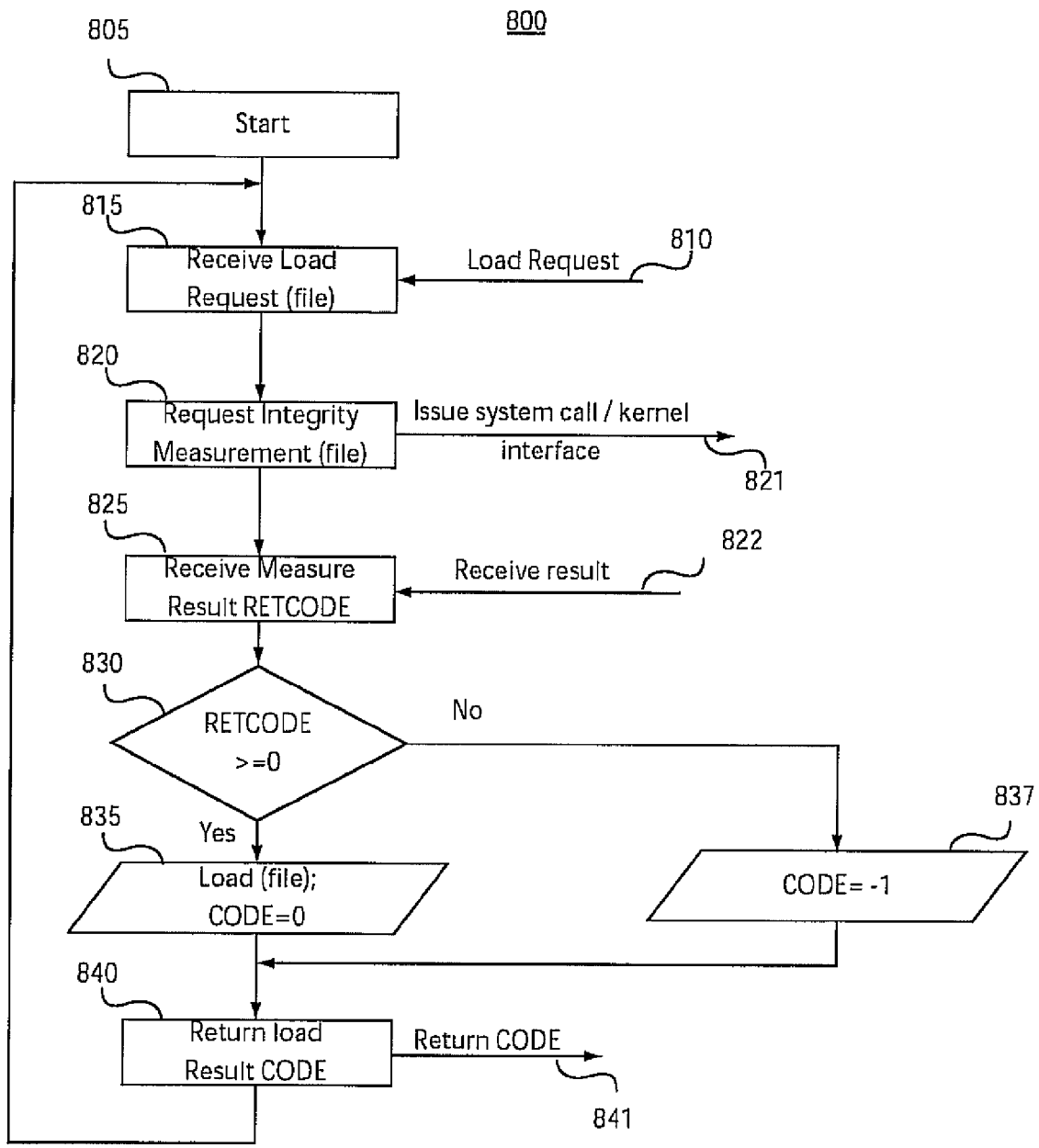
FIG. 8 is a block/flow diagram of another embodiment of the present invention depicting an integrity loader for enforcement of integrity.
Figure 9:
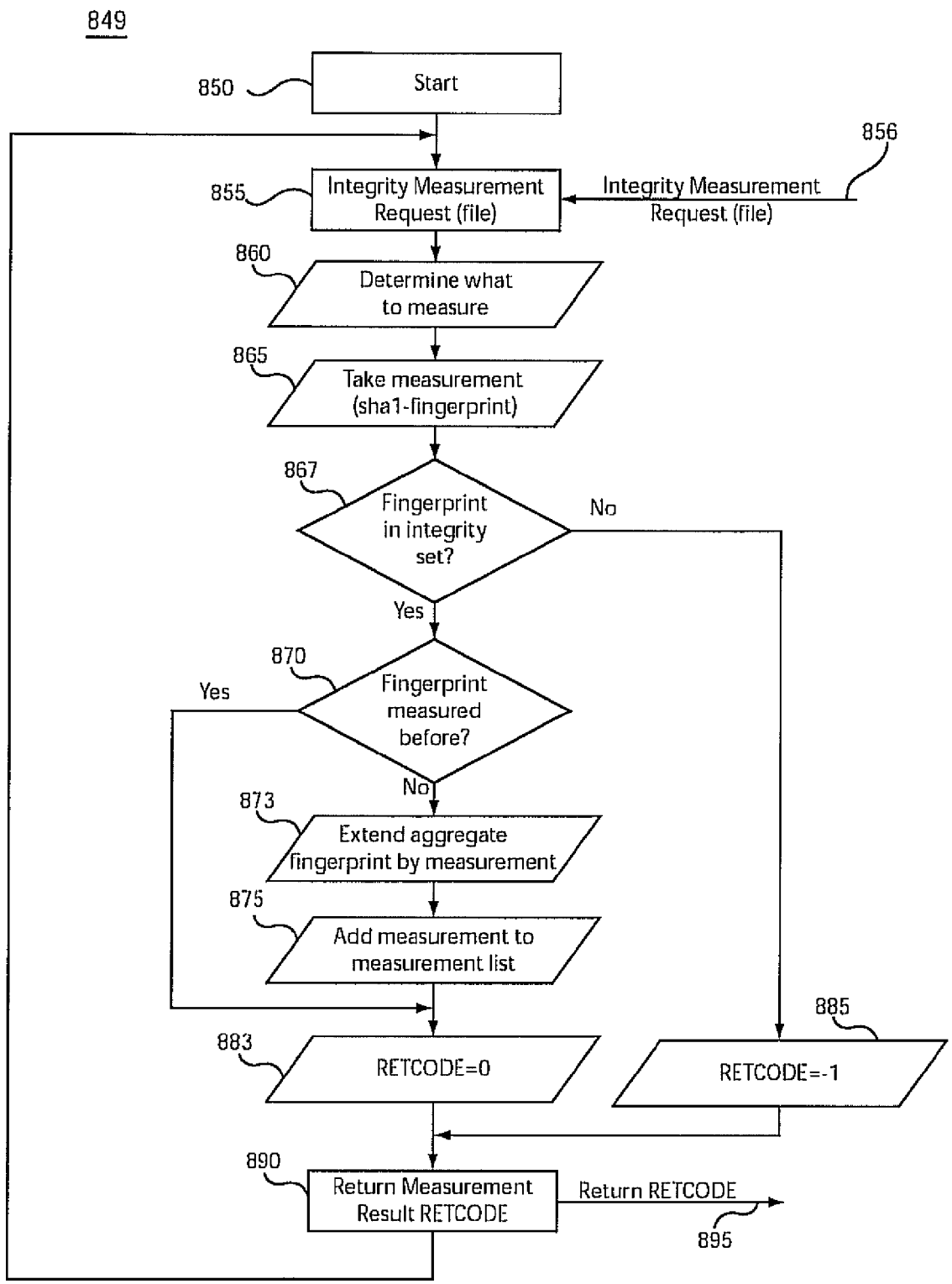
FIG. 9 is a block/flow diagram of another embodiment of the present invention depicting integrity measurement for enforcement of integrity.
Figure 10:
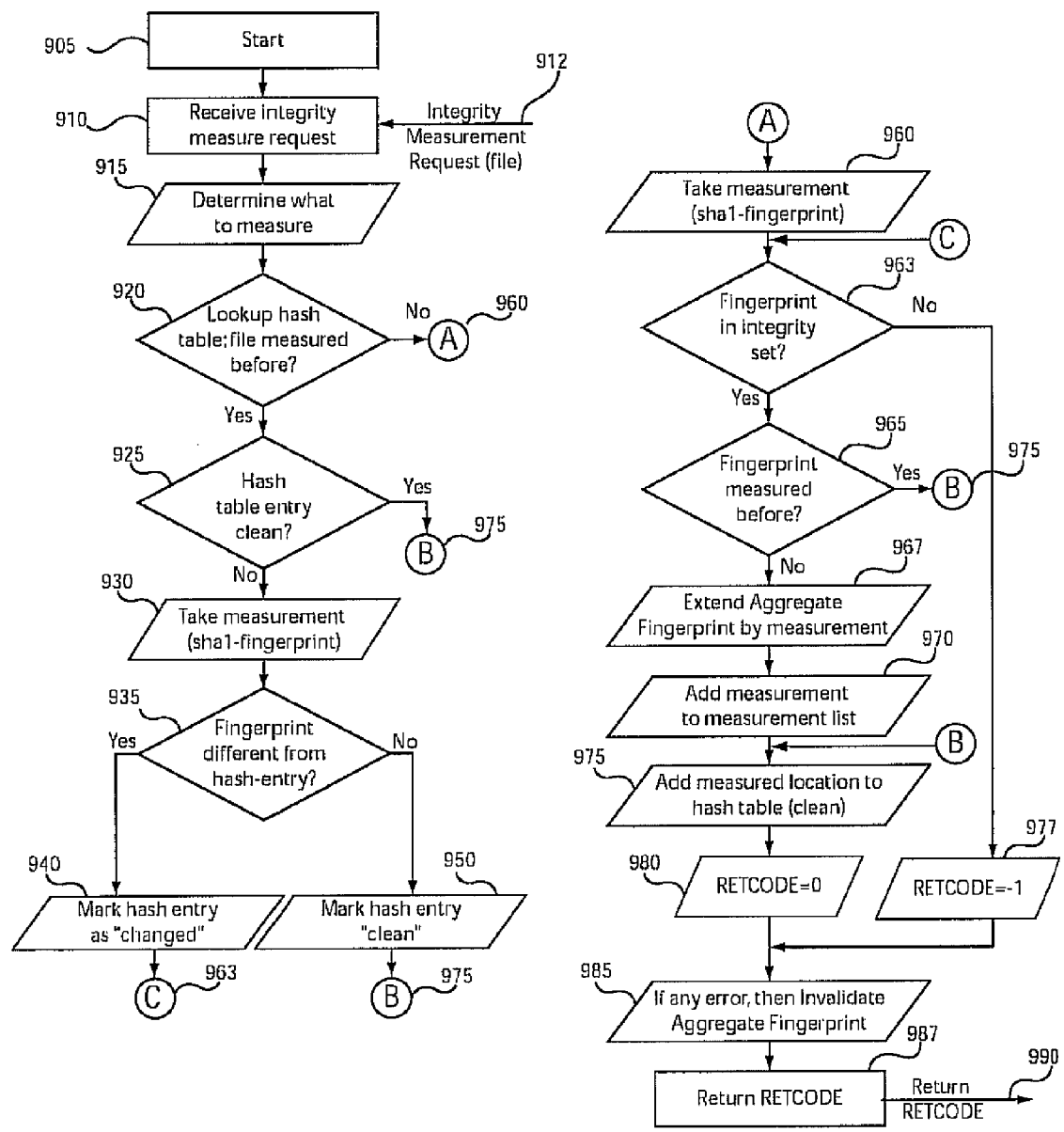
FIG. 10 is a block/flow diagram showing additional features to the system/methods of FIGS. 8 and 9.

FIGS. 8, 9, and 10 describe an illustrative integrity enforcement embodiment, where code is loaded into a system only if its measurement value is a member of a given preloaded (possibly empty) set of measurements values, called the integrity set.

Referring to FIG. 8, for a legacy system, a loader will receive a load request, load the file, and return to the main program. An integrity loader 800 replaces this normal code load function in the extended system. Loader 800 begins processing in block 805. Loader 800 waits for load requests in block 810. Once a load request for a file is received in block 815, a load enforcement requests an integrity measurement of this file in block 820. Then, the program waits in block 825 until the result of the integrity measurement is received in block 822. Return code (RETCODE) or other test condition is checked in block 830. If the received return code RETCODE is smaller then zero, block 837 sets its own return code (CODE) to a negative value (e.g., error code) and proceeds to block 840 without loading the file.

If RETCODE is greater than or equal zero, block 835 loads the file requested, and sets the return code (CODE) to zero (indicating a successful load). Then, in block 840 it returns to the calling function with the return code (CODE).

Referring to FIG. 9, an integrity measurement function 849 begins processing in block 850. Function 849 waits in block 855 for an integrity measurement request 856 from the integrity loader (800, FIG. 8). Once a request is received, what to measure is determined (e.g., find the file) in block 860. Then, the measurement is taken in block 865. In block 867, the newly measured value, e.g., a SHA1 value, is compared to the set of values in the integrity set. If the measured value is in the measurement set, a determination is made in block 870. If the measured value is not in the measurement set, then the return code RETCODE is set to a negative value or error in block 885.

In block 870, the process determines whether the present measurement was measured before. If it has been measured before, then it proceeds to block 883. If it has not been measured before, then an aggregate fingerprint in the PCR is extended in block 873 before the measurement is added to the measurement list in block 875.

The return code RETCODE is set to 0 in block 883 and the RETCODE is returned in block 890 through the return value in 895. If the measured value (e.g., SHA1) is not in the measurement set from block 867, then loading this file is prohibited and the integrity measurement function 849 proceeds with block 885 where it sets RETCODE to a negative value (error code) and returns this code in block 890 through the return code of 895.

Referring to FIG. 10, another embodiment provides additional features for the integrity measurement function 849 that avoid measuring files that did not change since they were previously measured. Integrity measurement function 900 begins in block 905 and waits in block 910 for integrity measurement requests 912. Once an integrity measurement request is received in block 910, the location of the file to measure is determined in block 915 before looking up a hash-table for this location in block 920. If the file location is found, e.g., was measured before in block 920, then the hash-entry is looked up in block 925. If the hash table entry is clean, the program proceeds to block 975. Otherwise, if the file was not measured before according to the lookup hash table, a measurement is taken in block 960.

In block 975, the fingerprint for the file location is compared to a set of pre-determined integrity measurements (e.g., SHA1 values). If the measurement for the location is in the integrity set, then the return code RETCODE is set to 0 in block 980.

If in block 925, the hash table entry is marked dirty, then the file location is measured again in block 930. In block 935, the newly measured value is compared with the value stored in the hash table entry for this location. If the new value is the same as the one in the hash table entry, then the entry is marked as clean in block 950 and the process proceeds to block 975 where the process continues as described above. If the new value is different from the one stored in the hash table entry, then the hash table entry is updated with the new value and marked as changed in block 940 before proceeding to block 963.

In block 963, a determination is made as to whether the current fingerprint being considered is in an integrity set. The integrity set may include fingerprints, which permit the integrity measurement to send an all-clear return code for integrity clearance. If the fingerprint is not in the integrity set, then RETCODE is set to a negative value or an error value in block 977.

It the fingerprint is in the integrity set, from block 963, it is determined whether the fingerprint was measured before in block 965. If it was measured before, then the process proceeds to block 975, which is described above.

If in block 920, the file location was not measured before, e.g. there is no hash table entry, then the process proceeds to block 960 where a new measurement is taken of the file location and the process continues from block 963.

In block 967, the aggregate fingerprint is extended by the measurement, in block 970, the measurement is added to the measurement list. The newly measured file location and its measurement are added to the hash table and marked clean for future reference in block 975. Afterwards, the process proceeds to block 980 and continues as described.

In any case (error or no error), the function proceeds to block 985 which implements a final error check and ensures that the measurement list is invalidated it any serious error occurs before returning the RETCODE in block 987 through the return value of the function call 990 to the integrity loader 800 (FIG. 8).

The present invention has many application scenarios and provides valuable system measurements in distributed applications. For example, clients that use services, for example, on remote server systems can determine the integrity of the remote run-time system on the server before invoking and relying on the server's service Servers can validate the client's run-time integrity before allowing them to use sensitive services, such as remote access services, bank transactions, stock trades, making reservations, etc. The present invention is particularly useful in Web service environments where clients have only very restricted possibilities to determine the trustworthiness of server systems. The present invention helps in these and many other cases by gathering reliable information about the run-time system of a party efficiently, securely and accurately.

Having described preferred embodiments of methods and systems for measuring status and state of remotely executing programs (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for evaluating a server execution environment comprising the steps of:
   selecting one or more executable parts of a server environment to measure;
   measuring the one or more executable parts in a server execution environment, the measurements resulting in a unique fingerprint for each respective selected part;
   aggregating the unique fingerprints by an aggregation function to create an aggregated value; and
   sending a measurement parameter which includes at least one of the unique fingerprints, and the aggregated value over a network interface to indicate a system status or state,
   wherein the aggregated value is extended with an invalid or random value when an error is detected throughout the measurement in order to render the server execution environment unable to prove its integrity to external parties.

2. The method as recited in claim 1, further comprising the step of loading one or more executable programs into a server memory to create the server execution environment.

3. The method as recited in claim 2, wherein the executable programs include one or more execution parameters to be measured in the measuring step.

4. The method as recited in claim 1, further comprising the step of storing the aggregated value in a secure location.

5. The method as recited in claim 1, wherein the measurement parameters include a base system measure and the method further comprises the step of employing the base system measure determined from a set of firmware and base operating system parameters of the server.

6. The method as recited in claim 5, wherein the step of sending a measurement parameter includes sending at least one of the unique fingerprints, the aggregated value and the base system measure over the network interface to indicate a system status or state.

7. The method as recited in claim 1, further comprising the step of challenging the server environment from a remote system to determine a list of programs running in the server environment.

8. The method as recited in claim 1, further comprising the step of challenging the server environment from a remote system to determine if the server environment is secure for performing a transaction.

9. The method as recited in claim 1, wherein the aggregated value includes information regarding an accumulation of events from boot up of the server execution environment.

10. The method as recited in claim 1, wherein the step of measuring includes loading code into a system only if a measurement value of the system is member of a given set of measurement values.

11. A program storage device readable by machine, tangibly embodying a program of instructions, wherein the program is executed by the machine to perform method steps for providing attestation of a server execution environment, as recited in claim 1.

12. The method as recited in claim 1, wherein only code that potentially affects a runtime integrity of the server execution environment is measured.

13. The method as recited in claim 1, wherein the one or more parts being measured comprise executable program code for a program being executed in the server execution environment.

14. A method for providing attestation in a server execution environment, comprising the steps of:
   measuring one or more executable parts of a server execution environment such that measurements are taken which result in a unique fingerprint for each respective selected part; wherein the step of measuring further comprises the step of:
   measuring code as the code is being loaded if the code was not measured before or a measurement entry of the code is marked to have possibly changed since a last measurement;
   aggregating the unique fingerprints by an aggregation function to create an aggregated value;
   sending a measurement parameter which includes at least one of the unique fingerprints, and the aggregated value over a network interface to indicate a system status or state,
   wherein the code is executable code, and
   wherein the one or more measured parts comprise a plurality of programs executing in the server execution environment, and a secure hash value is calculated over the plurality of programs before execution of the plurality of programs, the secure hash value for indicating to an external party what is actually running on the server environment.

15. The method as recited in claim 14, wherein the step of measuring code includes loading code into a system only if a measurement value of code to be loaded is a member of a given set of measurement values.

16. The method as recited in claim 14, wherein the step of measuring code further comprises the step of: if an earlier measurement exists for the code and a new measurement is different, marking the earlier measurement as changed and adding the new measurement to a list.

17. The method as recited in claim 14, further comprising the step of tracking changes in the code to avoid unnecessary measurements of the same code and to prevent multiple measurements for entries of the same code from being stored.

18. The method as recited in claim 14, wherein the step of measuring code further comprises the step of: if an earlier measurement exists and a new measurement is the same as the earlier measurement, ignoring the new measurement and marking the earlier measurement entry as unchanged.

19. The method as recited in claim 14, further comprising the step of loading one or more executable programs into a server memory to create the server execution environment.

20. The method as recited in claim 19, wherein the executable programs include one or more execution parameters to be measured in the measuring one or more parts of a server execution environment step.

21. The method as recited in claim 14, further comprising the step of storing the aggregated value in a secure location.

22. The method as recited in claim 14, wherein the measurement parameters include a base system measure and the method further comprises the step of employing the base system measure determined from a set of firmware and base operating system parameters of the server.

23. The method as recited in claim 22, wherein the step of sending a measurement parameter includes sending at least one of the unique fingerprints, the aggregated value and the base system measure over the network interface to indicate a system status or state.

24. The method as recited in claim 14, further comprising the step of challenging the server environment from a remote system to determine a list of programs running in the server environment.

25. The method as recited in claim 14, further comprising the step of challenging the server environment from a remote system to determine if the server environment is secure for performing a transaction.

26. The method as recited in claim 14, wherein the aggregated value includes information regarding an accumulation of events from boot up of the server execution environment.

27. A program storage device readable by machine, tangibly embodying a program of instructions, wherein the program is executed by the machine to perform method steps for providing attestation of a server execution environment, as recited in claim 14.

28. An attestation/integrity system for network environments, comprising:
- a server execution environment including one or more running programs, the server execution environment including one or more executable parts which are subject to measurement;
- a measurement agent which measures the one or more executable parts in a server execution environment, the measurements resulting in a unique fingerprint for each respective selected part;
- an aggregation function which aggregates the unique fingerprints to create an aggregated value; and
- a measurement parameter which includes at least one of the unique fingerprints, and the aggregated value which is sent over a network interface to indicate a system status or state of the server environment,
- wherein the aggregated value is extended with an invalid or random value when an error is detected throughout the measurement in order to render the server execution environment unable to prove its integrity to external parties.

29. The system as recited in claim 28, wherein the server environment includes one or more executable programs loaded into a server to create the server execution environment.

30. The system as recited in claim 29, wherein the executable programs include one or more execution parameters to be measured by the measuring agent.

31. The system as recited in claim 28, further comprising a secure location for storing the aggregated value.

32. The system as recited in claim 28, wherein the measurement parameter includes a base system measure determined from a set of firmware and base operating system parameters of the server execution environment.

33. The method as recited in claim 32, wherein the measurement parameter includes at least one of the unique fingerprints, the aggregated value and the base system measure.

34. The system as recited in claim 28, further comprising a challenger remotely disposed from the server execution environment, the challenger capable of requesting and receiving a list of programs running in the server environment during runtime of the server execution environment.

35. The system as recited in claim 28, further comprising a challenger remotely disposed from the server execution environment, the challenger capable of determining if the server execution environment is secure for performing a transaction by requesting the measurement parameter.

36. The system as recited in claim 28, wherein the aggregated value includes information regarding an accumulation of events from boot up of the server execution environment.

37. The system as recited in claim 28, wherein the system only loads code when a measurement value of the code is member of a given set of measurement values.

* * * * *